United States Patent
Amann et al.

(10) Patent No.: US 7,616,616 B2
(45) Date of Patent: Nov. 10, 2009

(54) APPARATUS AND METHOD FOR ENHANCED QUALITY OF SERVICE IN A WIRELESS COMMUNICATIONS NETWORK

(75) Inventors: Keith R. Amann, Westminster, CO (US); Oliver J. Krahn, Superior, CO (US)

(73) Assignee: SpectraLink Corp., Boulder, CO (US)

( * ) Notice: Subject to any disclaimer, the term of this patent is extended or adjusted under 35 U.S.C. 154(b) by 495 days.

(21) Appl. No.: 11/394,424

(22) Filed: Mar. 31, 2006

(65) Prior Publication Data
US 2007/0230389 A1    Oct. 4, 2007

(51) Int. Cl.
*H04B 7/212* (2006.01)
(52) U.S. Cl. .................. 370/338; 370/235; 370/329; 370/350
(58) Field of Classification Search ............ 370/338, 370/235, 329, 350
See application file for complete search history.

(56) References Cited

U.S. PATENT DOCUMENTS 5,970,062 A    10/1999    Bauchot
2003/0033423 A1    2/2003    Okabe et al.
2006/0187840 A1*    8/2006    Cuffaro et al. ............... 370/235
2008/0013522 A1*    1/2008    Benveniste .................. 370/350

* cited by examiner

*Primary Examiner*—Patrick N. Edouard
*Assistant Examiner*—Julio R Perez
(74) *Attorney, Agent, or Firm*—Uong Cabello (57) ABSTRACT

A wireless LAN having a plurality of wireless phones with enhanced medium access control which enables QoS functionality and being further modified to provide priority transmission of frames of information are associated with one or more access points that have also been enhanced with QoS functionality. The wireless phones are utilized to transmit and receive frames of voice information to and from other wireless phones via the access points. The WLAN also includes a router that operates to forward frames of voice information from one access point to another or to an IPPBX. SVP functionality located on a network server or on each wireless phone assists to facilitate the efficient reception of frames of voice information by the wireless phones. The modifications made to each wireless phone enables them to transmit frames of voice information on a priority basis with respect to all other wireless phones associated with a particular access point.

41 Claims, 7 Drawing Sheets

DATA FRAME FORMAT (40)

| FC | D | A1 | A2 | A3 | SC | A4 | QC | BODY | FCS |
|----|---|----|----|----|----|----|----|------|-----|

FIG. 4b

QoS CONTROL FIELD FORMAT (41)

| 0 | ACK | EOSP | 0 | UP |
|---|-----|------|---|-----|

FIG. 5

UP - AC MAP (50)

| PRIORITY | UP | 802.1D | AC | WMM |
|----------|----|--------|------|------|
| LOWEST ↓ HIGHEST | 1 | BK | AC_BK | BKGND |
| | 2 | - | AC_BK | BKGND |
| | 0 | BE | AC_BE | Best Effort |
| | 3 | EE | AC_BE | Best Effort |
| | 4 | CL | AC_VI | Video |
| | 5 | VI | AC_VI | Video |
| | 6 | VO | AC_VO | Voice |
| | 7 | NC | | |

APPARATUS AND METHOD FOR ENHANCED QUALITY OF SERVICE IN A WIRELESS COMMUNICATIONS NETWORK

FIELD OF THE INVENTION

This invention relates to the area of communications technology which has been developed to provide quality of service functionality in wireless LAN environments. Specifically, this invention relates to wireless LAN communication devices that operate according to the IEEE 802.11e standard and to provide enhanced QoS functionality.

BACKGROUND

Wireless voice applications often need to transmit frames of information on a priority basis in order to provide the user with a high quality communications experience. For instance, it may be desirable for frames of voice information to be transmitted from a particular wireless communications device before frames of data from the same device. Without the ability to prioritize frames of voice information over frames of data, and depending upon the number of users being serviced and the amount of traffic being processed at a particular point in a wireless network, conversations between wireless communications device users can become delayed. So for instance, from the time one user speaks into their wireless communications device to the time that they receive a response from another user can vary depending upon the ability of a network to manage the traffic volume. A typical solution to this problem is to utilize a higher radio transmission frequency, which in the case of the IEEE 802.11 standard is 2.4 Mhz. It is also common practice to utilize various voice compression algorithms such as well known Pulse Code Modulation, G.726-ADPCM, or G.728-LD-CELP algorithms, in order to more efficiently use the available bandwidth.

In addition to the delay problem caused by the lack of frame prioritization described above, high volumes of network traffic often result in collisions between frames. Collisions happen when the number of users being supported by a particular point in the network becomes high and/or two or more devices attempt to transmit frames of information over the wireless medium at the same time. As the result of such collisions, frames can be delayed which would result in a less than ideal user experience. The collision problem is typically resolved by essentially waiting for the collisions to happen, and than employing various techniques that allow the network devices, attempting to transmit frames of information, to wait before retrying the transmission. The network control protocols CSMA/CD and CSMA/CA implement such solutions to the collision problem. However, both CSMA/CD & CA only reduce the probability of that collisions will happen Generally speaking, network control protocols, such as CSMA/CD & CA, manage the transmission and reception of frames of information which includes such functions as detecting lost packets or frames of information and retransmitting these lost frames. These network management protocols were not developed to resolve such network performance problems as frame prioritization or to eliminate collisions between frames of information. On the other hand, the performance and usability of real-time network applications, such as voice and video, are significantly affected by frame prioritization and collision problems.

As mentioned previously, prioritization and collision problems create significant performance and usability issues for voice applications implemented on wireless communications devices in a wireless LAN (WLAN) environment. As originally constituted, the IEEE 802.11 standard did not specify how to implement QoS functionality on wireless networks. As such, it has been necessary for vendors of wireless communications devices for use on wireless networks to develop proprietary solutions that were compatible with the 802.11 standard in order to provide QoS functionality in a wireless network environment. One such proprietary solution is the subject of U.S. Pat. No. 6,494,499 and was developed by the SpectrLink Corporation called SpectraLink Voice Priority or SVP which can be implemented on a separate network server, on a wireless communications device, or at an access point in a WLAN. The SVP solution operates to prioritize voice frames over data frames and to mitigate collisions caused by two wireless devices attempting to transmit frames over the wireless medium at the same time.

More recently, the IEEE Standards Body has developed QoS enhancements to the 802.11 standard which are embodied in Part 11 to the 802.11 standard which is known as 802.11e. While the QoS enhancements embodied in 802.11e does address the problem of frame transmission priority between voice, video, and data frames generated or stored by a particular wireless communications device and while it addresses the frame collision problem at a particular wireless communications device, it does not address the problem of prioritizing packet transmissions between two or more wireless communications devices all competing for the wireless medium to transmit frames and it does not address collisions that occur between two or more wireless communications devices.

More specifically with regard to the prioritization problem, the IEEE 802.11e standard specifies that individual frames of voice information, for instance, can be labeled according to the priority with which it is desired that they should to be transmitted. For example, if voice, data, and video frames of information are stored in separate queues waiting to be transmitted by a device, all of the voice frames could be labeled highest priority and transmitted first, the video frames could be labeled medium priority and transmitted second, and the data frames could be labeled lowest priority and transmitted third. As mentioned above, while 802.11e does specify enhancements that affect the transmission priority of frames of dissimilar information that are generated by a particular wireless communications device, it does not specify how a wireless communications device can gain access to the wireless medium on a priority basis over one or more other wireless communications devices in order to transmit its frames of information. Generally, the 802.11 standard specifies that every wireless communications device will not contend to transmit data frames onto the wireless medium for a specified period of time after the medium becomes free. In this case that time period is referred to as the Distributed Coordination Function InterFrame Space or DIFS time. One of the 802.11e QoS enhancements to the 802.11 standard specifies a new interframe time called the Arbitration InterFrame Space or AIFS. The AIFS time is a variable time period and can be shorter or longer than a DIFS time depending upon the priority with which it is desired that a frame of information be transmitted.

As mentioned previously, the strategy for dealing with the collision problem specified by the CSMA/CD & CA protocols is to either detect that collisions have occurred or to reserve the medium for a particular communications device so that it can transmit its frames without collisions. Unfortunately, in the case of CSMA/CA, it is probable that collisions will occur between frames that communications devices attempt to transmit onto a medium. Section 9.2.4 of the IEEE 802.11 standard specifies a collision avoidance procedure that utilizes a random back off period which lowers the probability that collisions will occur on a wireless medium. Although the collision avoidance procedure specified by 802.11 is an improvement over that implemented by either CSMA/CD or CA, it still only lowers the probability that collisions will happen.

The collision problem discussed above relates to wireless networks where each of the wireless devices is able to sense the transmissions of all other wireless devices. However, it very often happens that one or more wireless devices may be out of the transmission range of the other wireless devices and so the sensing function of the CSMA/CD or CA protocol and for the IEEE 802.11 standard will not be able to sense the transmissions from the out of range device. This is referred to as a "hidden node problem". In this case, the existing protocols and standards would not be able to mitigate the collision problem.

We have discovered that it is possible to overcome the frame transmission priority problem between wireless communications devices, to eliminate the frame collision problem between wireless communications devices that are able to sense other devices transmissions, and to mitigate the collision problem in the hidden node case by modifying the inter frame time period that a wireless communications device waits to contend for the medium to transmit a frame of information after the medium becomes idle. Specifically, instead of waiting a standard time period such as a DIFS or AIFS time after the wireless medium become free to contend to transmit a frame of information, we have programmed a wireless communications device to immediately respond to the receipt of a frame of information with the transmission of a frame of information. In so doing, a wireless communications device implementing the method of our invention does not have to contend for the medium with other wireless communications devices which have frames waiting to be transmitted. As a wireless device implementing our invention is able to transmit frames during a time in which all other devices are waiting to contend for the medium, this device is able to transmit its frames on a priority basis and there is no possibility that collisions will happen, at least with respect to the non-hidden node problem. The method of our invention virtually eliminates collisions when there are hidden nodes because the method does not rely on sensing transmissions from all wireless devices associated with a particular access point, but rather responds to frames transmitted from an access point. As the process the AP follows when transmitting frames is serial, it is very unlikely that a hidden device will be transmitting at that time. The practical result of including our invention in a wireless device is that frame transmissions, and therefore user conversation, is not delayed due to priority or collision problems.

SUMMARY OF THE INVENTION

We have invented a method for prioritizing the transmission of one or more frames of information over a wireless medium from at least one modified, QoS enabled wireless communications device to a QoS enabled access point, that in a preferred embodiment is characterized by a first wireless communications device transmitting a priority labeled frame of information over the wireless medium to the QoS enabled access point which acknowledges receipt of the frame and stores the frame according to the content of its priority label, after which the QoS enabled access point transmits the priority labeled frame to a second modified, QoS enabled wireless communications device which acknowledges receipt of the frame and transmits a priority labeled frame of information to the QoS enabled access point after waiting less than the time interval specified for any other wireless communications device associated with the access point to begin arbitrating for access to the wireless medium after the medium becomes free.

According to another embodiment of the invention, the modified, QoS enabled wireless communications device and the QoS enabled access point are both compatible with the IEEE 802.11 standard.

In another embodiment of the invention, the modified, QoS enabled wireless communications device and QoS enabled access point are comprised of a plurality of medium access control level enhancements to provide quality of service for wireless voice communications. These enhancements can be an enhanced frame format, and enhanced DCA function, and an arbitrary interframe space time.

The modified, QoS enabled wireless communications device can be a mobile phone or a wireless, multimedia communications device.

The content of the priority label associated with a frame is a user priority.

In yet another embodiment of the invention, the specified time interval is either a DIFS or an AIFS time.

BRIEF DESCRIPTION OF THE DRAWINGS

FIG. 8b is a continuation of the logical flow diagram of FIG. 8a.

DETAILED DESCRIPTION OF THE INVENTION

It is necessary to possess a working knowledge of ANSI/IEEE Std 802.11, 1999 Edition (802.11) and IEEE P802.11e/D13.0, January 2005 (802.11e) edition, both of which are hereby incorporated into this application in their entirety, in order to implement the method and apparatus of our invention. We also discuss the use of the SpectraLink Voice Priority (SVP) technology in relation to our invention. SVP is the subject of U.S. Pat. No. 6,496,499 assigned to the SpectraLink Corporation and is hereby incorporated in its entirety into this application.

Figure 1:
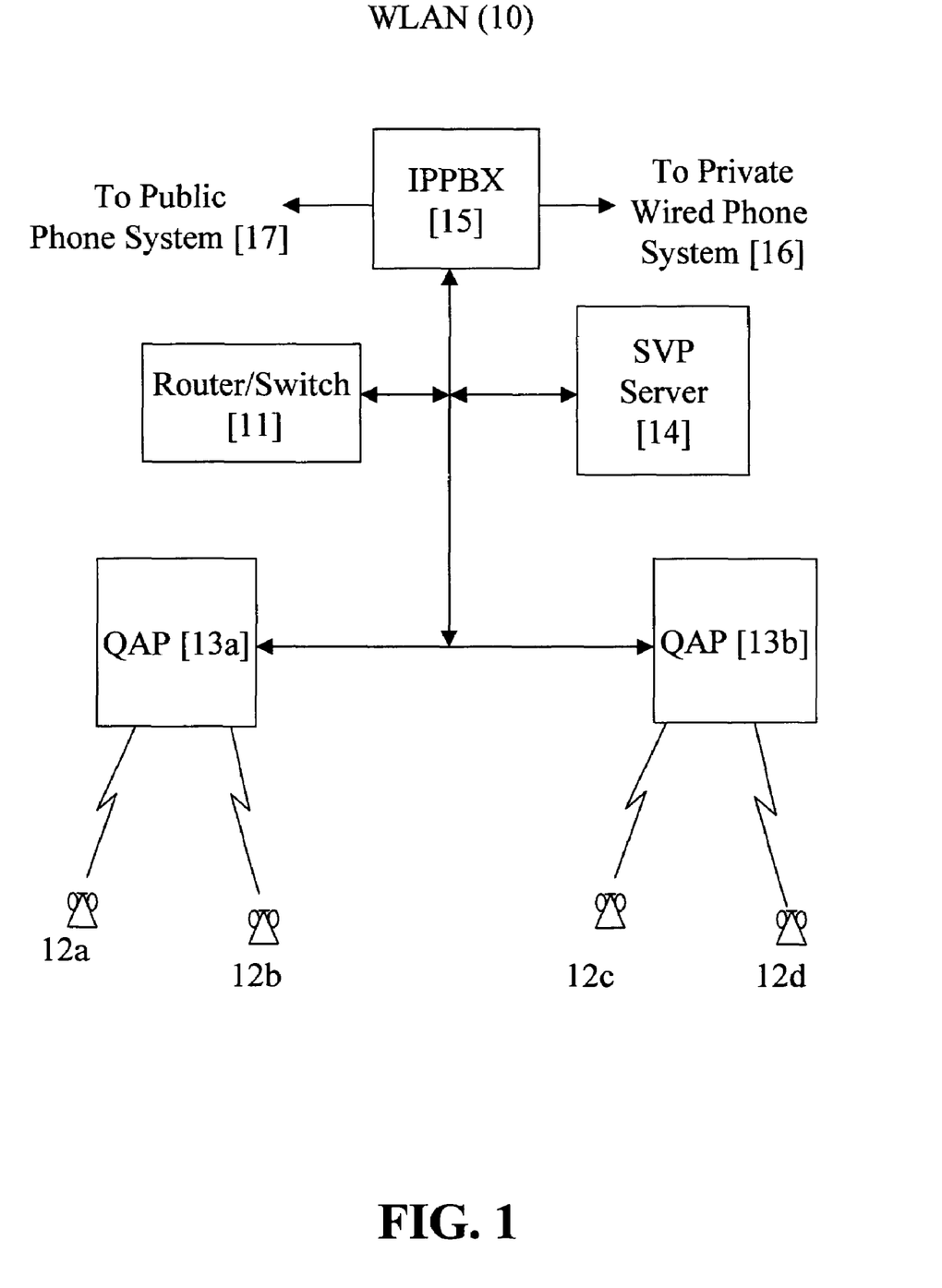
FIG. 1 is a functional block diagram showing a wireless local area network in which the invention can operate.

The preferred embodiment of our invention modifies the operation of a wireless communications device that implements the QoS enhancements specified by the 802.11e standard; however, our invention can operate on a wireless communications device that operates in an 802.11 wireless environment that does not employ the QoS enhancements mentioned above. The wireless device employed in the preferred embodiment of our invention is a wireless phone capable of transmitting and receiving frames of voice information or frames of any multimedia information. Going forward, we will refer to this modified, QoS enabled wireless device as an MQdevice. Referring to FIG. 1, the MQdevices 12 and 12b of our invention are associated with QoS enabled access point 13a, hereinafter referred to as QAP 13a, and MQdevices 12c and 12d of our invention are associated with QAP 13b in the wireless LAN WLAN 10 using the communications protocol and frame formats specified by the 802.11e standard. The process for associating a wireless device with an access point will not be described here as it is described in the 802.11 standard in sufficient detail. It should be understood, however, that it is not necessary to enhance a wireless device according to the QoS enhancements specified by the 802.11e standard in order for our invention to work, as our invention is compatible with non-standard wireless communication protocols as well. Further more, our invention also works in conjunction with 802.11 wireless communications devices that transmit and receive frames to and from a non-QoS AP. While the frame may be delayed at the AP longer than at a QAP, the invention works equally as well from the perspective of the wireless communications device. So, although this application describes the preferred embodiment of our invention with respect to a QAP and a number of MQdevices, it should be understood that our invention is in no way limited to be implemented upon such devices. The 802.11e standard specifies QoS enhancements to the 802.11 standard which specifies the medium access control (MAC) and physical layer (PHY) protocols and compatible interconnection of data communications equipment via various wireless mediums in a local area network (LAN) using the CSMA/CA medium sharing mechanism. A typical WLAN environment in which the MQdevice operates is described hereafter with reference to FIG. 1.

In FIG. 1, the MQdevices 12a, 12b, 12c & 12d are all wireless communications devices with QoS capability that we have modified in a manner that permits them to transmit voice frames labeled for priority transmission (Pframes) or voice frames not labeled for priority transmission (frames) to QoS enabled access points (QAPs) 13a and 13b or non-QoS enabled access points on a priority basis, relative to all other wireless devices, whether these other wireless devices are MQdevices, QoS enabled devices, or non-QoS enabled devices. The QAP's 13a and 13b receive Pframes of information from the MQdevices and then transmit these frames to the destination MQdevice according to their priority. Communications over the LAN 10 between the QAPs 13a and 13b and a Router/Switch 11, or any other type of device that is able to receive frames from one device and forward them to another device, adhere to the well known IEEE 802.3 (Ethernet) standard protocol as do communications between the Router/Switch 11, the SVP Server 14, and the IPPBX 15. Router/Switch 11, herein after referred to as Router 11, generally operates to receive Pframes from one QAP, QAP 13a for instance, and to transmit them to another QAP, QAP 13b for instance, according to the destination address information contained in the Pframe. In general, SVP Server 14 functions to regulate or manage the times at which MQdevices can expect to receive Pframes of information and it also functions to group Pframes together in time. Both the timing and grouping functionality provided by the SVP server results in power savings for the MQdevice, which results in longer battery life, and, as the result of Pframe grouping, seamless hand-off of an MQdevice between one QAP to another when the MQdevice is roaming. The functionality of the SVP server will not be described in this application in detail as this technology is thoroughly described in the incorporated U.S. Pat. No. 6,496,499. It should be understood, however, that the SVP functionality does not have to be provided in the WLAN 10 by a separate SVP Server 14, but alternatively, it can be incorporated into the MQdevice as will be described latter in this application. It should also be understood that, although the preferred embodiment of our invention includes the SVP functionality, the SVP functionality does not have to be provided at all, as the operation of our invention does not depend upon the availability of this functionality. Continuing to refer to FIG. 1, the IPPBX 15 operates to direct Pframes of information to either a private, wired phone system 16 or to a public phone system 17 depending upon the destination address contained in the Pframe.

Figure 2:
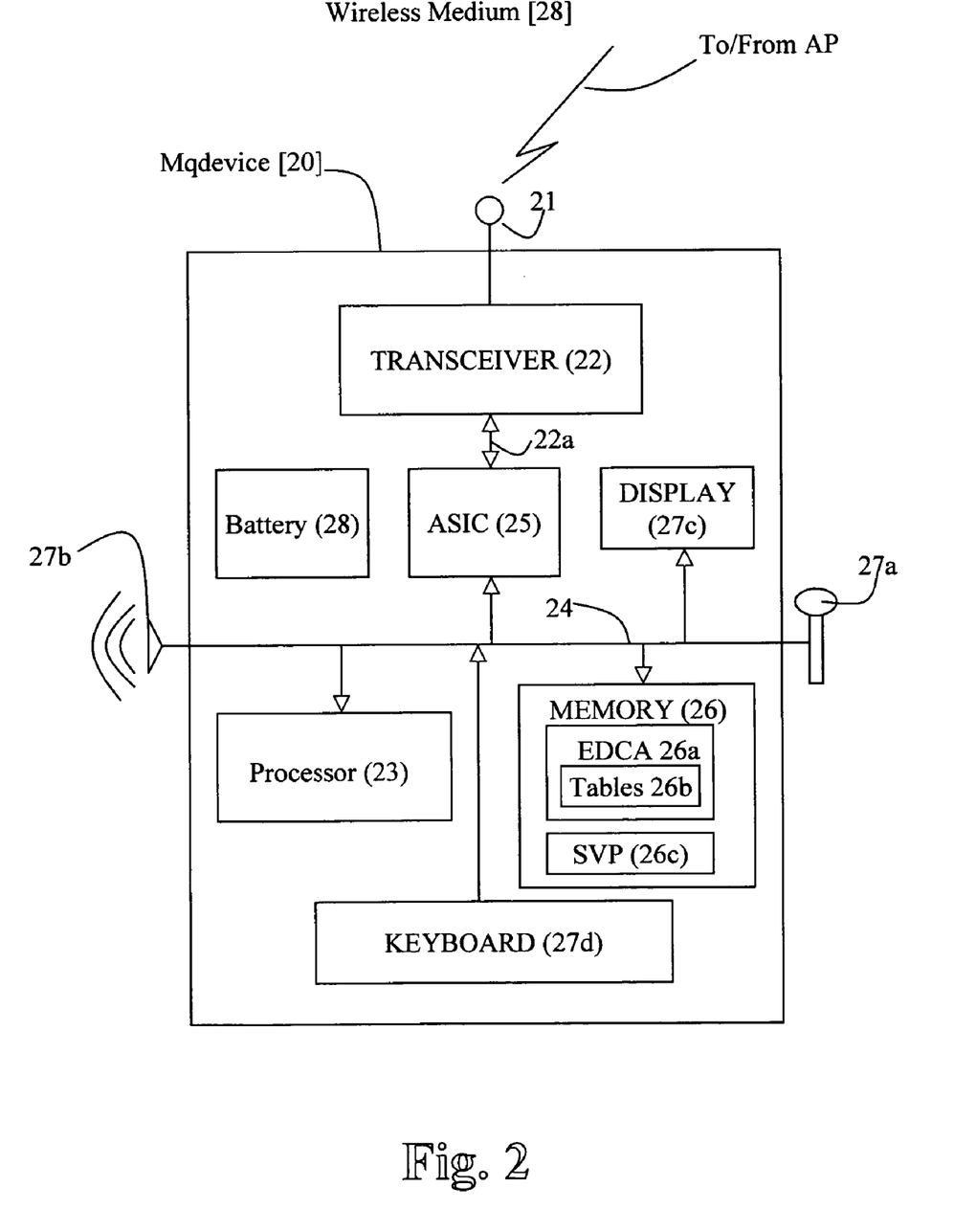
FIG. 2 is a functional block diagram of a QoS enabled wireless mobile device.

FIG. 2 is a functional block diagram of one of the MQdevices 12a, 12b, 12c, or 12d which for the purposes of this description will be referred to as MQdevice 12. MQdevice 12 includes antenna 21, which operates to propagate wireless voice signals and is the initial reception point for incoming wireless voice signals. The antenna is connected to a transceiver 22, which operates to demodulate the signals containing voice information received from the antenna or to modulate signals prior to their being sent to the antenna. The transceiver is connected over a serial bus 22a to an ASIC 25 that contains firmware which implements encryption capability, certain aspects of the telephony application, and provides other wireless functionality such as the conversion of a parallel stream of voice data to a serial stream of voice data. The encryption, telephony application, and parallel to serial bit stream conversion are all well know to wireless communications engineers and so will not be described here in any detail.

Continuing to refer to FIG. 2, the ASIC 25 is connected over parallel bus 24 to a processor 23 and memory 26. The processor in the preferred embodiment is a Texas Instruments TMS320C5410 digital signal processor, but this invention is not limited to this particular processor. The processor generally functions, in conjunction with memory 26 and ASIC 25, to manage the operation of the phone, including the telephony application. Generally, this includes such functionality as initiating, maintaining, and tearing down communications sessions. The processor communicates over the parallel bus 24 with the ASIC 25 and memory 26. The memory 26 can be an EEPROM, RAM or flash memory and is generally employed to store the telephony application, certain QoS mechanisms that the MQdevice utilizes to prioritize the transmission of Pframes of information. More specifically, memory 26 is used to store a software module that implements medium access control (MAC) functionality that is enhanced according to the 802.11e standard to support WLAN applications with QoS requirements and which we further modified according to our invention. The fundamental medium access protocol specified by 802.11e is a distributed coordination function (DCF), known as carrier sense multiple access with collision avoidance (CSMA/CA). Generally, the DCF allows for automatic medium sharing between compatible physical mediums through the use of the CSMA/CA protocol and a random back off time following a busy condition. Additionally, all wireless devices use immediate positive acknowledgement (ACK) where retransmission of frames, that are not successfully received, is scheduled by the sender if no ACK is received. In operation, the CSMA/CA protocol reduces the probability that collisions will occur between two or more wireless devices that have been waiting for the medium to become idle. A distributed carrier sense strategy is employed where each wireless device in the LAN monitors the state of the medium and at the point that the medium becomes idle, the device starts a random back off procedure which must be completed before it gains access to the medium. The use of this random back off procedure decreases the probability that collisions will occur.

As mentioned above, the 802.11e standard specifies some enhancements to a standard DCF which includes the addition of some QoS-specific mechanisms, such as an arbitration inter frame space (AIFS) and four access categories, and modified frame formats, that when implemented on a wireless device, which in this case is an MQdevice, enable it to contend for the wireless medium and transmit Pframes on a priority basis. Although we describe our invention in the context of an enhanced DCF, it works equally as well in conjunction with a wireless communications device that operates according to the 802.11 standard as well. These QoS-specific mechanisms and modified frame formats will be described later with reference to FIG. 4a, FIG. 4b, and FIG. 5. The 802.11e standard refers to this contention-based channel access method as the enhanced distributed channel access (EDCA) function and at least one instance of this function is stored in memory 26 as EDCA function 26a shown in FIG. 2. Our invention modifies the operation of the 802.11e standards based EDCA function and the 802.11 DCF so that an MQdevice or non-QoS enabled wireless communications device does not have to contend with other wireless devices for the medium, thus guaranteeing that it will be able to transmit a Pframe of information on a priority basis over all other devices associated with a particular QAP, therefore avoiding collisions and having to initiate a back off procedure. We will return to a more detailed description of our invention with respect to the operation of the EDCA function later.

Figure 3:
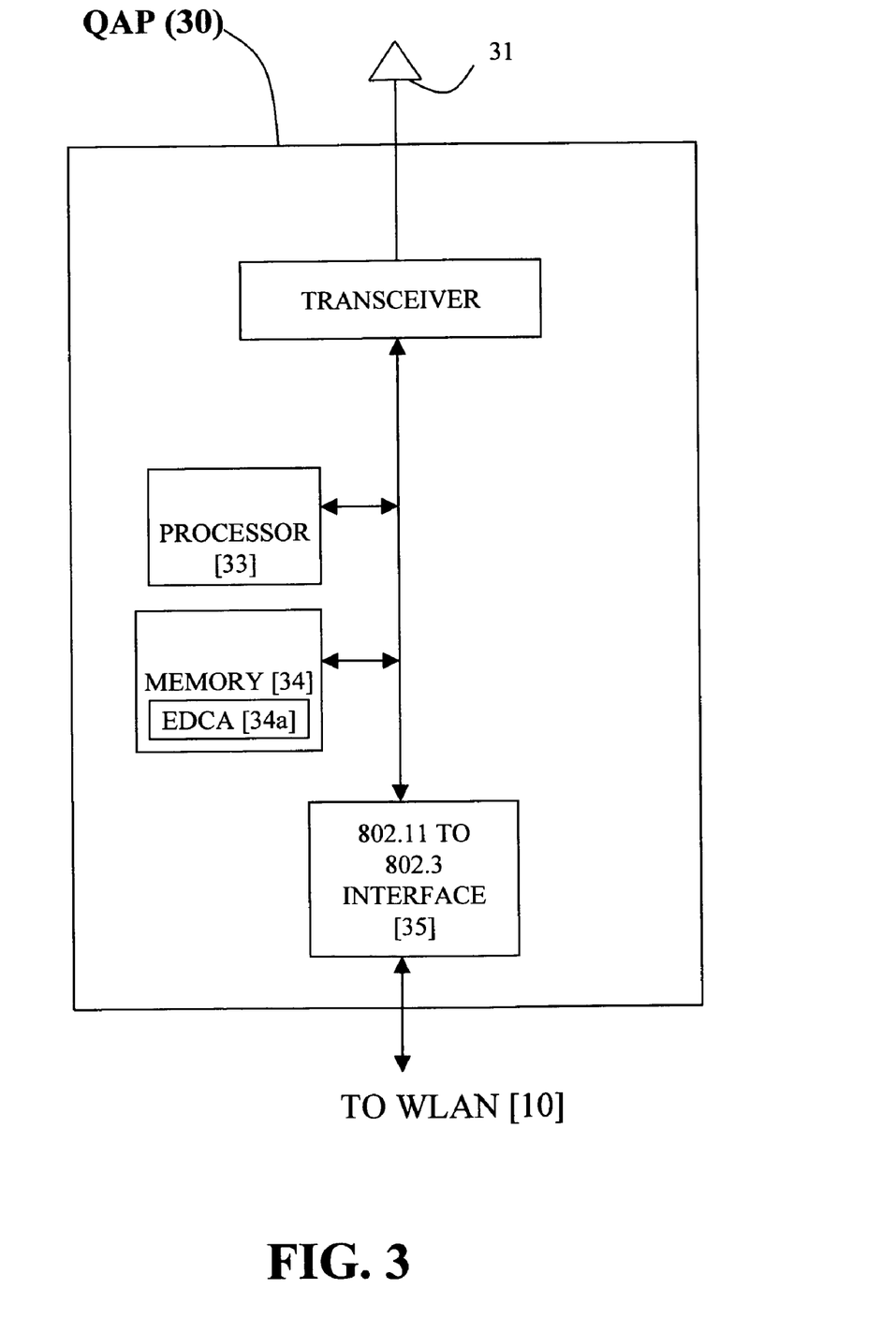
FIG. 3 is a functional block diagram of a QoS enabled access point.

FIG. 3 is a functional block diagram of a QoS enabled access point 13, or QAP 13. QAP 13 generally operates to receive wireless signals from an originating wireless device, places the frames into a queue or queues where they are available to be transmitted to a destination wireless device associated with the QAP 13. The QAP 13 also receives frames of information from originating wireless devices in the 802.11 format and converts the frames of information into the well known 802.3 Ethernet format which can then be transmitted over the Ethernet to another QAP where they are converted to the 802.11 format for transmission to the destination wireless device. From the perspective of the WLAN 10, QAP 13 has similar functionality to an MQdevice, in as much as it receives Pframes of information from MQdevices, places them in a queue according to their priority, contends for the medium according to the CSMA/CA protocol, and when it acquires the medium, transmits the Pframes according to their priority to MQdevices. Unlike the MQdevices, a QAP generates beacons used, for among other things, to broadcast capability information to wireless devices within transmission range and it is the target for wireless device associations. Specifically, the QAP 13 of FIG. 3 has an antenna 31, transceiver 32, processor 33, and memory 34 all of which possess functionality similar to the antenna 21, transceiver 22 processor 23, and memory 26 of MQdevice 12 of FIG. 2. Specifically, the EDCA function 34a used by the QAP is stored in memory 34 and generally functions to manage Pframes at the QAP. The 802.11 to 802.3 interface 35 of FIG. 3 generally operates to convert frames of information from the 802.11 format to the Ethernet format and transmit these frames to the WLAN 10.

Figure 4A:
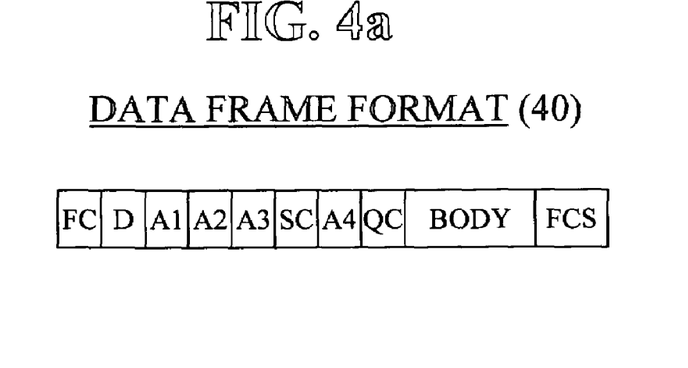
FIG. 4a shows the 802.11e standard data frame format with the QoS control field.
Figure 4B:
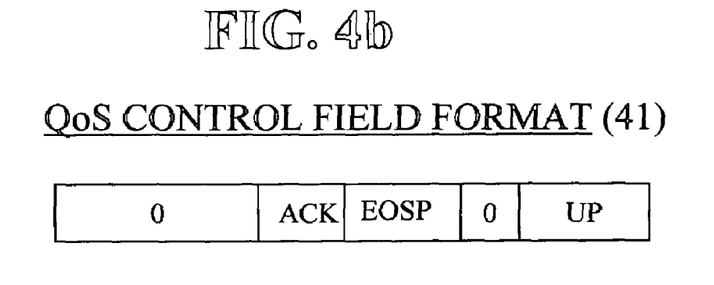
FIG. 4b shows the QoS control field of FIG. 4a in more detail.
Figure 5:
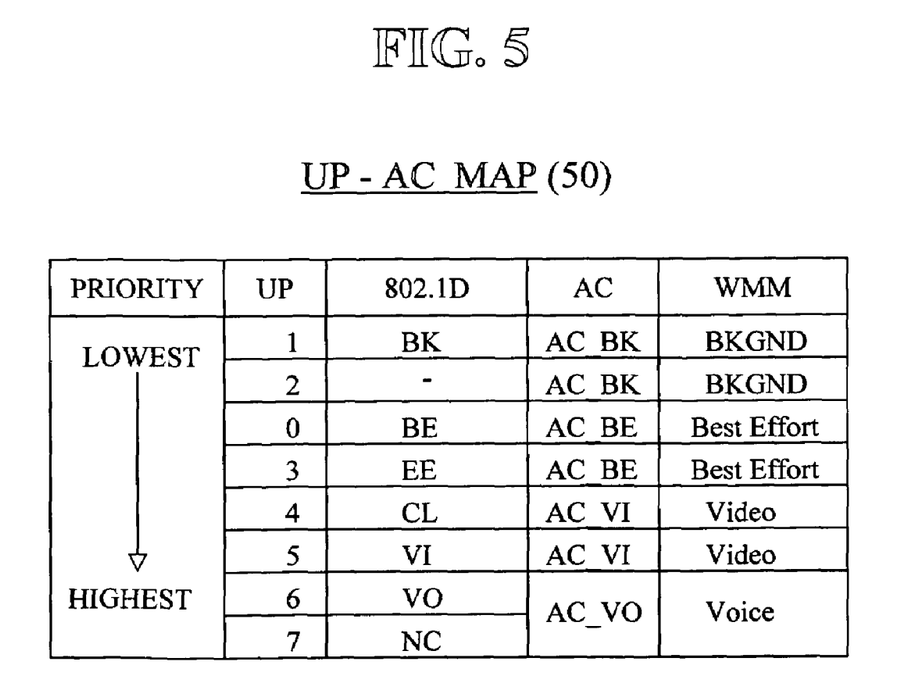
FIG. 5 is a table showing the mapping between user priority code and access categories.

Section 7 of the 802.11e standard describes MAC frame formats and so we will not take time to do so here in detail other than to with reference to FIGS. 4a and 4b. The MAC data frame format specified by the 802.11e standard contains a three bit QoS control field (QC) which is shown with reference to FIG. 4a. FIG. 4b shows the QC field mentioned above with respect to the data fame format 40 which consists of two octets. The three bit user priority field, or UP field, specified by the IEEE 802.1D standard, which contains frame transmission priority information used to signal the priority of a Pframe. FIG. 5 is a UP to access category (AC) map used by the EDCA 26a to convert the UP information contained in a Pframe to an AC that is associated with a queue, in memory 26 in FIG. 2 and in memory 34 in FIG. 3, which to store a Pframe. Specifically, the EDCA function examines the user priority field and uses this information to look up an AC shown in the UP-AC Map 50 in FIG. 5. EDCA functions, located at the MQdevices and QAPs, define four ACs that provide support for the prioritized delivery of Pframes in the WLAN 10. These four access categories are termed background, best effort, video, and voice.

As mentioned above with reference to FIG. 2, our invention modifies the operation of the EDCA function 26a so that a MQdevice does not have to contend with any other wireless device for the medium, thus guaranteeing that it will be able to transmit a Pframe of information on a priority basis over all other devices associated with a particular QAP without having to initiate a back off procedure. The EDCA function 26a provides prioritized, distributed access to the wireless medium using frames labeled with one of eight different user priorities (UP). One of the 802.11e QoS enhancements to 802.11 resides in the creation of four access categories that provide support for the delivery of UP labeled frames. The access categories (ACs) are derived from the UPs according to the UP to AC map in FIG. 5. For each AC, the EDCA function 26a residing on an MQdevice 12 contends for the opportunity to transmit a Pframe of information over the medium using a set of EDCA parameters, stored in MQdevice memory, a minimum specified idle time referred to as an Arbitration InterFrame Space time, and a variable duration contention window CW all of which will be described in more detail below and all of which are calculated by the EDCA function prior to a call and stored in tables 26b in memory 26 on MQdevice 12 of FIG. 2. The parameters used by the EDCA function to control its operation at a MQdevice are specified by the MIB attribute table dot11EDCATable located in Annex D of the 802.11e standard, and includes the four entries of the EDCA parameters corresponding to the four possible ACs which are AC index 1, index 2, index 3 and index 4 which correspond to background, best effort, video, and voice frames respectively.

According to the 802.11 standard, a number of time periods are specified during which a wireless device should not contend for the wireless medium to transmit a frame of information or during which a wireless device should not send an ACK in response to receiving a frame of information. These time periods are specified from the time the wireless medium becomes free to the time the wireless devices are permitted to contend for the wireless medium and are referred to in the standard as interframe times. One interframe time is called the Distributed Coordination Function Interframe Space or DIFS and another interframe time is called the Short Interframe Space or SIFS. Both the DIFS 62 and SIFS 61 time periods are illustrated with reference to the FIG. 6 timing diagram and described in section 9.2.3 of the 802.11 standard. The DIFS is used by wireless communications devices and access points. A wireless communications device is allowed to transmit if it determines that the medium is free at the transmit DIFS slot boundary after a correctly received frame, and its back off time has expired. The SIFS time is used by wireless communications devices, access points, MQdevices and QAPs for, among other things, an ACK frame and is the time from the end of the last frame to the beginning of the subsequent frame as observed at the interface to the wireless medium, which could be the transceiver 22 in FIG. 2 for instance.

Referring again to FIG. 6, the 802.11e standard specifies an additional interframe time period called the Arbitration Interframe Space or AIFS 63 which is utilized by the EDCA 26a when contending for the wireless medium to transmit data frames, which can be frames of voice, video, or data information for instance. The AIFS 63 is illustrated in comparison to the SIFS 61 and DIFS 62 times in FIG. 6. The AIFS 63 is the minimum specified idle duration time and is used by all MQdevices 12 to transmit all frames of data, all frames of management information, and certain types of control frames. More specifically, a MQdevice can transmit a frame if it determines that the wireless medium is free at the AIFS slot boundary for that AC after a correctly received frame and the back off time for that AC has expired. The AIFS time is variable and can to be a shorter or longer time period than a DIFS time, depending upon which AC a Pframe it is associated with. The AIFS time is calculated using parameters located in Annex D of the 802.11e standard in the dot11EDCATableAIFSN table that is stored in memory 26. Specifically, this table stores an attribute which specifies the number of time slots, after a SIFS time, that MQdevice, for a particular AC, will sense the medium to be free either before transmitting a frame or executing a back off procedure. The default values for this attribute are seven, if the dot11EDCATable Index is 1, three, if the dot11EDCATable Index is 2, and two if the index values is something else. As will be described in detail later in this application, we discovered that it was possible to enable a higher level of transmission priority for Pframes generated in MQdevices by employing shorter fixed or variable inter frame times than those specified by 802.11e for transmitting frames of data after the wireless medium becomes free.

Figure 6:
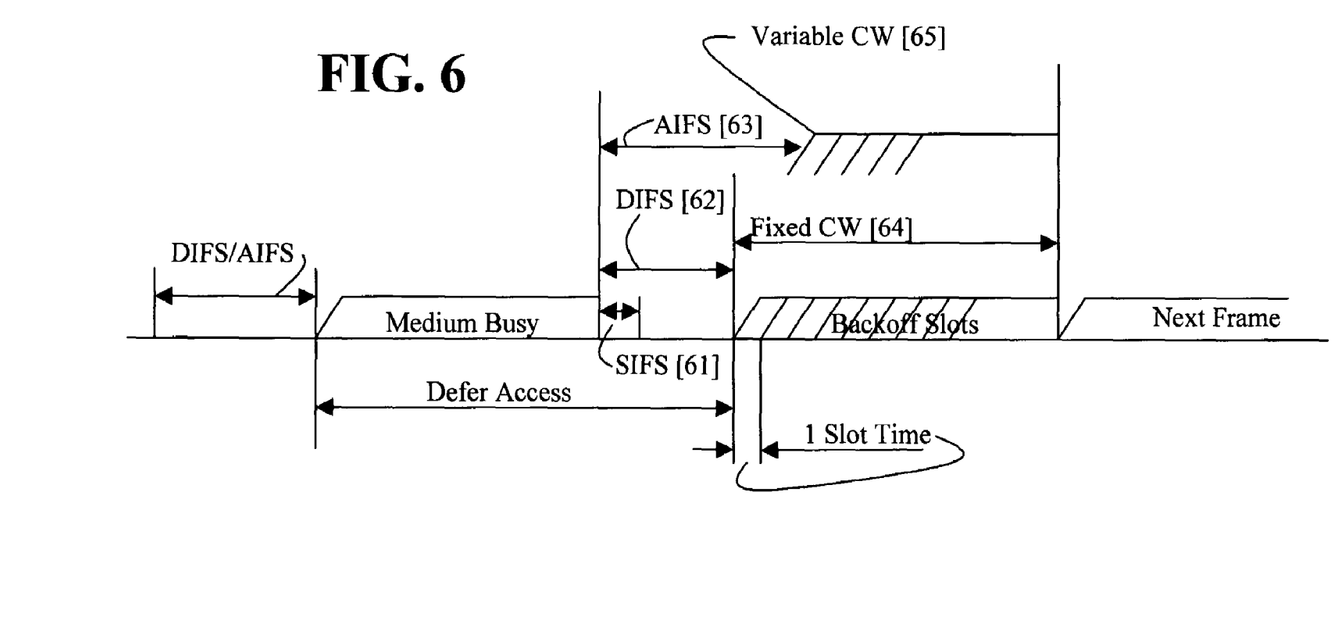
FIG. 6 is an illustration of the timing relationships between the various inter frame times used to implement the 9-2.11 and the 802.11e standards.

Continuing to refer to FIG. 6, after waiting an AIFS time after the medium becomes free, the EDCA 26a will then contend for the wireless medium during a contention window (CW) 64. The CW is not a fixed time period but varies from aCWmin to aCWmax depending upon the AC index value that is specified in the EDCATableIndex located in Annex D of the 802.11e standard. The CW values for MQdevices are calculated by the EDCA using rules specified by the 802.11e standard and which can be found in Annex D under EDCATableCWmin & max in the standard which in turn is stored in memory 26. The CW value is used by the EDCA 26a to compute a random back off number which is employed by an EDCA back off procedure in the event that the EDCA is contending for the wireless medium and senses that the medium is busy. This EDCA back off procedure is described in section 9.9.1.5 of the 802.11e specification in detail and is well understood by those skilled in the art of wireless communications and so we will not spend much time here with its description other than to mention that the back off procedure uses a back off timer that is set to a random back off time by the EDCA 26a and that the back off procedure will be invoked when a frame is requested to be transmitted and the wireless medium is determined by an MQdevice to be busy, and the back off timer has a value of zero. This variable CW mechanism lowers the probability that there will be collisions between EDCA functions on separate MQdevices contending for the wireless medium. Additionally, collisions between contending EDCA functions within a single MQdevice are resolved at that MQdevice where the Pframes marked with a higher priority AC will be given transmission priority over Pframes marked with a lower priority AC.

Continuing to refer to FIG. 6, the EDCA 26 generally operates to transmit Pframes by sensing the wireless medium to determine whether it is free or not, and if the medium is busy, the EDCA decrements a back off timer for that access category and then senses the wireless medium again. If at this point the medium is free, it waits an AIFS time and then begins contending for the wireless medium. If the medium is busy at the time that the EDCA starts to contend for the medium, then the EDCA invokes the previously mentioned back off procedure. If the EDCA completes the back off procedure and senses that the medium is free and it has a Pframe ready for transmission, it will proceed to transmit the frame.

Figure 7:
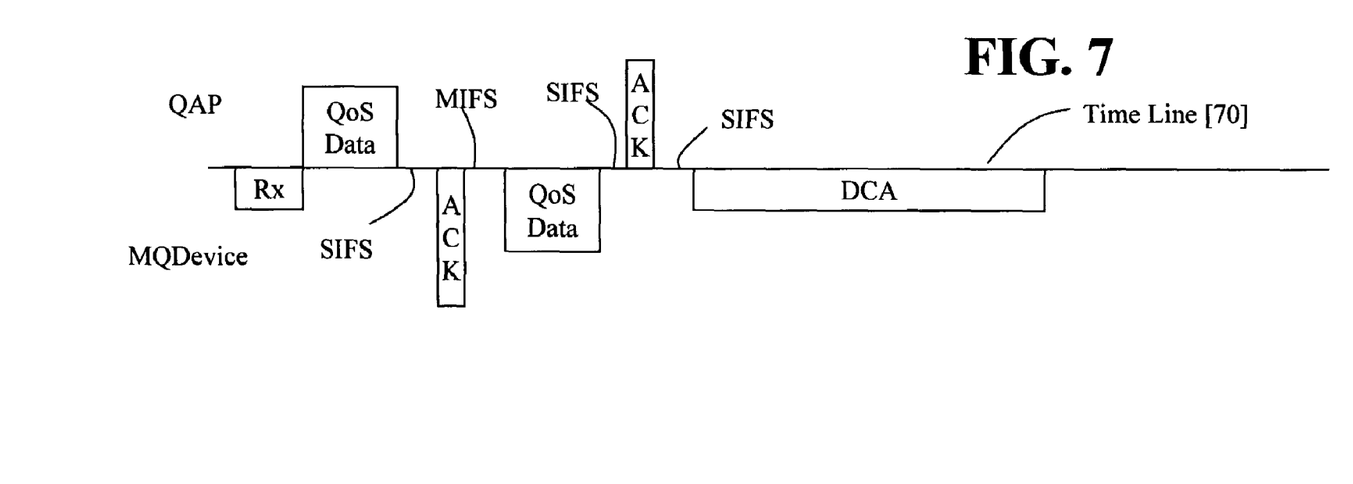
FIG. 7 is a time line illustrating the method of the invention.

The contention process described above adds delay between the end points of a wireless communications session which lowers the general quality of a wireless communications session for the users. We have discovered that it is possible to by-pass the need for an MQdevice 12 to contend for the wireless medium, as described above with reference to FIG. 6, after it receives a Pframe of voice information by immediately responding to the received Pframe by transmitting a Pframe without waiting the specified interframe space time, which in this case would be one AIFS time period. FIG. 7 is a timing diagram illustrating the general operation of the modified EDCA function 26a of our invention. The actions of the QAP 13 appear above the time-line 70 and the actions of the MQdevice 12 appear below the time-line. On the time-line at Rx, the MQdevice transceiver is turned on and in a state that it can receive a Pframe from the QAP, which the QAP then sends. The MQdevice, after waiting one SIFS time, responds to successfully receiving the Pframe by transmitting an ACK back to the QAP. After transmitting the ACK, the MQdevice waits a period of time that is less than the interframe times specified by 802.11e for transmitting frames of data after the wireless medium becomes free. We refer to this time period that is less than the interframe time specified by the standard for transmitting a frame after the medium becomes free as a modified interframe space or MIFS. As opposed to an AIFS time which is calculated by the EDCA function located in the MAC as previously mentioned with reference to FIG. 6, in the preferred embodiment of our invention the MIFS can be a fixed time value used by the MAC when transmitting frames with an AC of "AC-VO" and in the preferred embodiment of our invention is a SIFS time. Specifically, we modified the standard 802.11e MAC logic so that it does not wait an AIFS time after the medium is free after the ACK to contend for the medium in order to transmit a frame, but only waits a SIFS time. If the QAP successfully receives the one or more Pframes, it waits one SIFS time before sending an ACK back to the MQdevice. Alternatively, the MIFS could be a variable time period calculated by the MAC in the same fashion as is the AIFS but using different EDCA configuration table index and attribute values than those used to calculate an AIFS period.

Figure 8A:
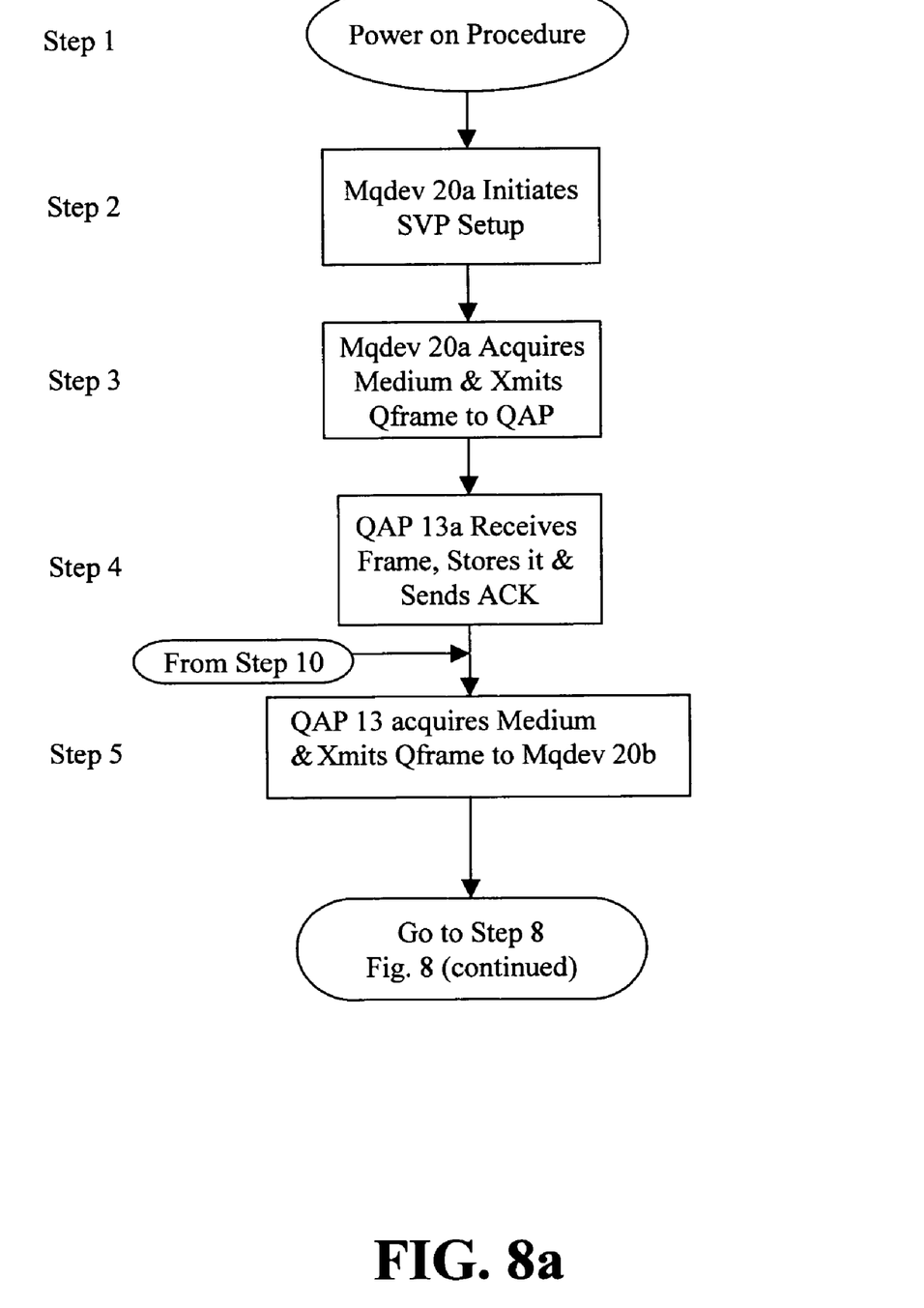
FIG. 8a is a logical flow diagram of the method of the invention.
Figure 8B:
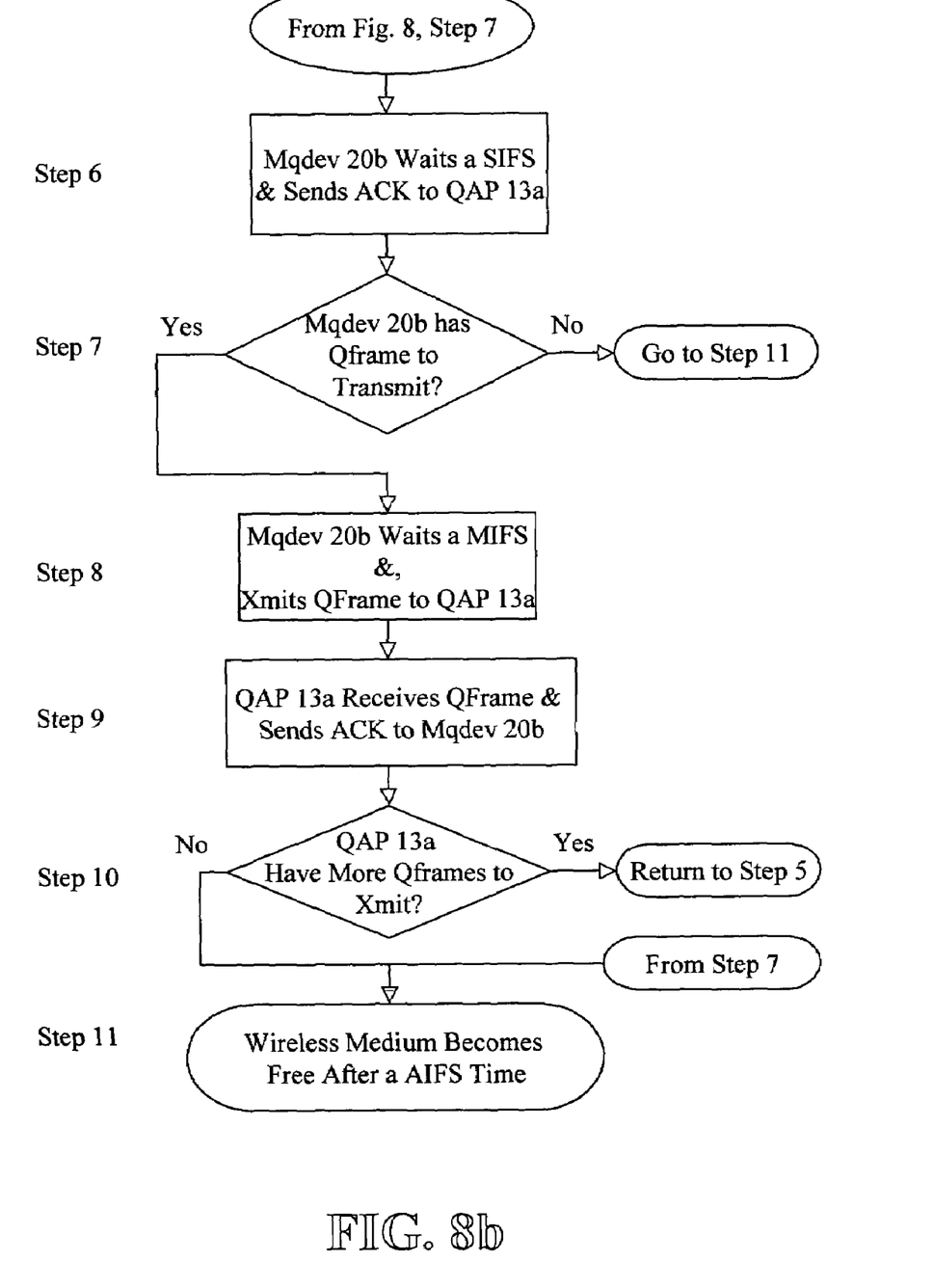

A more detailed description of the operation of the modified EDCA functionality 26a of our invention in the context of the general operation of a MQdevice is provided with reference to the logical flow diagram in FIG. 8a and FIG. 8b. In Step 1 of FIG. 8a, a power on procedure is started which includes but is not limited to such actions as a request by the MQdevice for authentication, negotiating for association with QAPs within transmission range of the MQdevice, and security negotiation. At the point that the power on procedure is completed, and in the preferred embodiment of our invention, the MQdevice can initiate a communication session by first initiating the SVP functionality in Step 2. Initiating the SVP functionality is described in the referenced U.S. Pat. No.

6,494,499 and generally involves the creation, by the MQdevice 12a, of a transmission time ordered list that it utilizes to anticipate the reception of Pframes from QAP 13a. More specifically, the MQdevice anticipates the reception of a Pframe by turning its transceiver 22 on just prior to expecting a Pframe from QAP 13a. After the SVP initialization is complete, in Step 3 the MQdev 12a, for instance, uses its EDCA function 26a to contend for the wireless medium and if successful transmits at least one Pframe to QAP 13a. Provided the QAP successfully receives the Pframe from the MQdev 12a, in Step 4 the QAP stores the Pframe in the correct AC queue waiting for transmission and after a SIFS time of receiving the Pframe responds to the MQdev 20a with an ACK. In Step 5, the QAP uses its EDCA function 34a to contend for the wireless medium and at the point in time that it acquires access to the medium it transmits the Pframe, stored in the AC queue, to the MQdev 12b, for instance.

Referring now to FIG. 8b, provided that the MQdevice successfully receives the Pframe, in Step 6 it waits a SIFS time and then sends an ACK back to the QAP. In Step 7, if the MQdevice 12b has one or more Pframes stored in the AC queue waiting for transmission, then in Step 8 it waits a MIFS time after sending the ACK in Step 6 and transmits at least one of the Pframes to the QAP. As described previously with reference to FIG. 6, the MIFS is a period of time that is less than the interframe times specified by 802.11e for transmitting frames of data after the wireless medium becomes free. The MIFS time is not calculated by EDCA 26a but is the period of time, a SIFS time according to our preferred embodiment, it takes the EDCA to detect that an ACK has been sent and then initiate the transmission of a Pframe. More specifically, the EDCA 26a in step 8, sends the Pframe immediately after the MQdevice 12b generates an ACK transmit complete interrupt which is an operation initiated by the wireless phone application, described with reference to FIG. 2, in response to sending the ACK to QAP 13a. All of the ACKs, waiting, and transmission functionality is performed by the EDCA function such as the EDCA function 26a of FIG. 2, for instance. In Step 10 of FIG. 8b, if the QAP has more Pframes stored in the AC queue ready for transmission, then it waits a PIFS time and the process returns to Step 5 of FIG. 8a. Returning to Step 10, if the QAP has no more Pframes in the AC queue waiting for transmission, then the process proceeds to Step 11 where the wireless medium becomes free after a AIFS time.

Although we have described our invention in the context of the IEEE 802.11 standard, it should be understood that the scope of our invention should not be limited to this standard alone, but can be applied to other medium access protocols whether they are standards based or proprietary in nature. It should also be understood, that although the preferred embodiment of our invention is described to include the SVP functionality, SVP is not needed for the invention to operate to provide the benefits of frame transmission and collision avoidance functionality. Further, it should be understood that although we have described our invention in the context of mobile communications devices in a wireless communications network that implement the QoS enhancements to the 802.11 standard, our invention also applies to mobile communications devices that do not implement the QoS enhancements to the 802.11 standard.

We claim:

1. In a wireless LAN, including at least one quality of service enabled access point and a plurality of quality of service enabled wireless devices, a method of prioritizing the transmission of at least one priority frame of information over a wireless medium from at least one of the plurality of quality of service enabled wireless devices to the at least one quality of service enabled access point comprising the steps of:

the at least one quality of service enabled access point transmitting at least one priority frame of information to the at least one quality of service enabled wireless device in accordance with the contents of a priority label;

the at least one quality of service enabled wireless device receiving the at least one priority frame of information from the at least one quality of service enabled access point and transmitting an acknowledgement of the receipt of the at least one priority frame to the at least one quality of service enabled access point after a time interval specified for transmitting the acknowledgement; and the at least one quality of service enabled wireless device transmitting at least one priority frame of information to the at least one quality of service enabled access point after waiting less than the time interval specified for any other wireless communications device associated with the at least one quality of service enabled access point to begin arbitrating for access to the wireless medium after the medium becomes free.

2. The method of claim 1 wherein the at least one quality of service enabled wireless device and the at least one quality of service enabled access point both operate according to the 802.11 standard.

3. The method of claim 1 wherein the at least one quality of service enabled wireless device and at least one quality of service enabled access point are both comprised of a plurality of medium access control level enhancements to provide quality of service for voice communications.

4. The method of claim 3 wherein the plurality of medium access control level enhancements are comprised of an enhanced frame format, a modified, enhanced distributed channel access function, and an arbitrary interframe space time.

5. The method of claim 1 wherein the at least one quality of service enabled wireless device is a mobile phone.

6. The method of claim 1 wherein the at least one quality of service enabled wireless device is a multimedia communications device.

7. The method of claim 1 wherein the content of the priority label is a user priority.

8. The method of claim 1 further comprising the step of initializing voice priority functionality on the at least one quality of service enabled wireless device prior to the at least one quality of service enabled access point transmitting a priority labeled frame of information.

9. The method of claim 1 wherein the specified time interval is one of a distributed coordination function interframe space time or an arbitration interframe space time.

10. In a wireless LAN, including at least one access point and a plurality of wireless devices, a method of prioritizing the transmission of at least one frame of information over a wireless medium from at least one of the plural wireless devices to the at least one access point comprising the steps of:

the at least one access point transmitting the at least one frame of information to the at least one of the plural wireless devices;

the at least one of the plural wireless devices receiving the at least one frame of information from the at least one access point and transmitting an acknowledgement of the receipt of the at least one frame to the at least one access point after a time interval specified for transmitting the acknowledgement; and the at least one of the plural wireless devices transmitting one frame of information to the at least one access point after waiting less than the time interval specified for any other wireless device associated with the at least one access point to begin arbitrating for access to the wireless medium after the medium becomes free.

11. The method of claim 10 wherein the at least one of the plural wireless devices and the at least one access point operate according to the 802.11 standard.

12. The method of claim 10 wherein the at least one of the plural wireless devices includes a modified distributed channel access function.

13. The method of claim 10 wherein the at least one of the plural wireless devices is a mobile phone.

14. The method of claim 10 wherein the at least one of the plural wireless devices is a multimedia communications device.

15. The method of claim 10 further comprising the step of initializing voice priority functionality on the at least one of the plural wireless devices prior to the at least one access point transmitting a frame of information.

16. The method of claim 10 wherein the specified time interval is one of a distributed coordination function interframe space time or an arbitration interframe space time.

17. In a wireless LAN, including at least one quality of service enabled access point and a plurality of quality of service enabled wireless devices, an apparatus for prioritizing the transmission of at least one priority frame of information over a wireless medium from at least one of the plurality of the quality of service enabled wireless devices to the at least one quality of service enabled access point comprising:
the at least one quality of service enabled access point transmitting the at least one priority frame of information to the at least one of the plural quality of service enabled wireless devices in accordance with the contents of a priority label;
the at least one of the plural quality of service enabled wireless devices for receiving the at least one priority frame of information from the at least one quality of service enabled access point and for transmitting an acknowledgement of the receipt of the priority frame to the at least one quality of service enabled access point after a time interval specified for transmitting the acknowledgement; and
the at least one of the plural quality of service enabled wireless devices for transmitting one priority frame of information to the at least one quality of service enabled access point after waiting less than the time interval specified for any other quality of service enabled wireless device associated with the at least one quality of service enabled access point to begin arbitrating for access to the wireless medium after the medium becomes free.

18. The apparatus of claim 17 wherein the at least one of the plural quality of service enabled wireless device and the at least one quality of service enabled access point both operate according to the 802.11 standard.

19. The apparatus of claim 17 wherein the at least one of the plural quality of service enabled wireless device and the at least one quality of service enabled access point include a plurality of medium access control level enhancements to provide quality of service for voice communications.

20. The apparatus of claim 19 wherein the plurality of medium access control level enhancements are comprised of an enhanced frame format, a modified, enhanced distributed channel access function, and an arbitrary interframe space time.

21. The apparatus of claim 17 wherein the at least one quality of service enabled wireless device is a mobile phone.

22. The apparatus of claim 17 wherein the at least one quality of service enabled wireless device is a wireless, multimedia communications device.

23. The apparatus of claim 17 wherein the content of the priority label is a user priority.

24. The apparatus of claim 17 further comprising voice priority functionality located on the at least one of the plural quality of service enabled wireless device that is initialized prior the at least one quality of service enabled access point transmitting the priority labeled frame of information.

25. The apparatus of claim 17 wherein the specified time interval is one of a distributed coordination function interframe space time and an arbitration interframe space time.

26. A method of prioritizing the transmission of at least one frame of information from at least one of the plural wireless devices over a wireless medium comprising the steps of:
the at least one of the plural wireless devices receiving the at least one frame of information and transmitting an acknowledgement of the receipt of the at least one frame after a time interval specified for transmitting the acknowledgement; and
the at least one of the plural wireless devices transmitting one frame of information after waiting less than the time interval specified for any other wireless device to begin arbitrating for access to the wireless medium after the medium becomes free.

27. The method of claim 26 wherein the at least one of the plural wireless devices operate according to the 802.11 standard.

28. The method of claim 26 wherein the at least one of the plural wireless devices includes a modified distributed channel access function.

29. The method of claim 26 wherein the at least one of the plural wireless devices is a mobile phone.

30. The method of claim 26 wherein the at least one of the plural wireless devices is a multimedia communications device.

31. The method of claim 26 further comprising the step of initializing voice priority functionality on the at least one of the plural wireless devices prior to receiving a frame of information.

32. The method of claim 26 wherein the specified time interval is one of a distributed coordination function interframe space time or an arbitration interframe space time.

33. An apparatus for prioritizing the transmission of at least one priority frame of information over a wireless medium, comprising:
at least one quality of service enabled wireless device operating to receive a priority frame of information in accordance with the contents of a priority label; and for transmitting an acknowledgement of the receipt of the priority frame after a time interval specified for transmitting the acknowledgement; and transmitting one priority frame of information after waiting less than the time interval specified for any other quality of service enabled wireless device to begin arbitrating for access to the wireless medium after the medium becomes free.

34. The apparatus of claim 33 wherein the at least one of the plural quality of service enabled wireless device operates according to the 802.11 standard.

35. The apparatus of claim 33 wherein the at least one of the plural quality of service enabled wireless device include one or more medium access control level enhancements to provide quality of service for voice communications.

36. The apparatus of claim 35 wherein the one or more medium access control level enhancements are comprised of an enhanced frame format, a modified, enhanced distributed channel access function, and an arbitrary interframe space time.

37. The apparatus of claim 33 wherein the at least one quality of service enabled wireless device is a mobile phone.

38. The apparatus of claim 33 wherein the at least one quality of service enabled wireless device is a wireless, multimedia communications device.

39. The apparatus of claim 33 wherein the content of the priority label is a user priority.

40. The apparatus of claim 33 further comprising voice priority functionality located on the at least one of the plural quality of service enabled wireless device that is initialized prior to receiving the priority labeled frame of information.

41. The apparatus of claim 33 wherein the specified time interval is one of a distributed coordination function interframe space time and an arbitration interframe space time.

* * * * *

UNITED STATES PATENT AND TRADEMARK OFFICE
CERTIFICATE OF CORRECTION

PATENT NO. : 7,616,616 B2  
APPLICATION NO. : 11/394424  
DATED : November 10, 2009  
INVENTOR(S) : Amann et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 719 days.

Signed and Sealed this

Nineteenth Day of October, 2010

David J. Kappos  
*Director of the United States Patent and Trademark Office*